US010621123B2

(12) United States Patent
Dalmatov et al.

(10) Patent No.: US 10,621,123 B2
(45) Date of Patent: Apr. 14, 2020

(54) MANAGING STORAGE SYSTEM PERFORMANCE (71) Applicant: EMC IP Holding Company LLC, Hopkinton, MA (US)

(72) Inventors: Nickolay Dalmatov, Saint Petersburg (RU); Kirill Bezugly, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/274,534

(22) Filed: Feb. 13, 2019

(65) Prior Publication Data

US 2020/0042473 A1 Feb. 6, 2020

(30) Foreign Application Priority Data

Aug. 2, 2018 (RU) .................................. 2018128297

(51) Int. Cl.
  *G06F 9/30* (2018.01)
  *G06F 13/20* (2006.01)
  *G06N 20/00* (2019.01)
(52) U.S. Cl.
  CPC ............. *G06F 13/20* (2013.01); *G06N 20/00* (2019.01); *G06F 2213/40* (2013.01)
(58) Field of Classification Search
  CPC ..................................................... G06F 16/30
  See application file for complete search history.

(56) References Cited

U.S. PATENT DOCUMENTS

| 8,239,584 | B1* | 8/2012 | Rabe ..................... G06F 3/0605 710/8 |
| 8,504,670 | B2* | 8/2013 | Wu ........................ G06F 16/188 709/223 |
| 9,141,305 | B2* | 9/2015 | Tylik ..................... G06F 3/0605 |
| 10,333,951 | B1* | 6/2019 | Natanzon ............ H04L 63/1425 |
| 10,333,984 | B2* | 6/2019 | Best ........................ H04L 63/20 |

* cited by examiner

*Primary Examiner* — Cheng Yuan Tseng
(74) *Attorney, Agent, or Firm* — Ryan, Mason & Lewis, LLP (57) ABSTRACT

Implementations are provided herein for systems, methods, and a non-transitory computer product configured to analyze an input/output (IO) pattern for a data storage system, to identify an application type based on the IO pattern, and to select optimal deduplication and compression configurations based on the application type. The teachings herein facilitate machine learning of various metrics and the interrelations between these metrics, such as past IO patterns, application types, deduplication configurations, compression configurations, and overall system performance. These metrics and interrelations can be stored in a data lake. In some embodiments, data objects can be segmented in order to optimize configurations with more granularity. In additional embodiments, predictive techniques are used to select deduplication and compression configurations.

20 Claims, 4 Drawing Sheets

MANAGING STORAGE SYSTEM PERFORMANCE

BACKGROUND

Technical Field

This application relates to managing storage system performance and more specifically to optimizing data deduplication and data compression settings.

Description of Related Art

Computer systems may include different resources used by one or more host processors. Resources and host processors in a computer system may be interconnected by one or more communication connections. These resources may include, for example, data storage devices such as those included in the data storage systems manufactured by Dell EMC. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data with a storage device, which may also contain a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data, but are also becoming more and more interconnected, raising the amounts of data exchanged at an exponential rate.

To address this demand, modern data storage systems ("storage systems") are put to variety of commercial uses. Naming just two, storage systems can be coupled with host systems to store data for purposes of product development. Alternatively, storage systems can be used by financial institutions to store critical data in large databases. For many uses to which such storage systems are put, it is extremely important that they be highly reliable and exceptionally efficient so that critical data is not lost or inaccessible.

One method of enhancing storage system capacity, and therefore performance, is data deduplication. Deduplication is a space-saving technology intended to eliminate redundant (duplicate) data (such as, files, objects, blocks, and the like) on a data storage system. By saving only one instance of a file, disk space can be significantly reduced. For example, a file of size 10 megabytes (MB) may be stored in ten folders of each employee in an organization that has ten employees. Thus, in such a case, 100 megabytes (MB) of the disk space is consumed to maintain the same file of size 10 megabytes (MB). Deduplication ensures that only one complete copy is saved to a disk.

Subsequent copies of the file are only saved as references that point to the saved copy, such that end-users still see their own files in their respective folders. Similarly, a storage system may retain 200 e-mails, each with an attachment of size 1 megabyte (MB) With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves a unique copy of each block. For example, if just a few bytes of a document, a presentation, or a file are changed, only the changed blocks are saved. The changes made to a few bytes of the document, presentation or file does not constitute an entirely new file.

A second means of enhancing storage system performance is data compression. Data compression may be implemented by recognizing a level of non-identical similarity between a first data set and a second data set, and then using a representation of the differences between the first and second data sets to represent the first or the second data set. In some implementations, for example and without limitation, a first new data set is organized as binary strings of equal length that are compared with a second existing data set that is organized as binary strings of the same length as the first data set. A hash function may be used to generate probabilistically unique values that represent the strings. The values may be used as indicators of the differences between strings.

Although data deduplication and compression can enhance storage system performance, there are instances in which either or both of these techniques can have the opposite effect, i.e., degrading storage system performance. In fact, the effectiveness of deduplication and data compression depend, to some degree, on the type of data being deduplicated or compressed. Some data is deduplicable, while other data is not. Similarly, some data is compressible, and some is not. When a storage system utilizes processing resources to attempt to compress or deduplicate data that is not compressible or deduplicable, the storage system performs less efficiently than it could. There is thus a need for a tool that enhances system performance by determining whether data is compressible, deduplicable, or both. Optionally, this same tool could choose deduplication and compression settings based on data storage object type.

SUMMARY OF THE INVENTION

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

In accordance with one aspect of the invention is a method used in managing data storage system performance, the method comprising: analyzing an input/output (I/O) pattern for a storage object; identifying an application type based on the I/O pattern; and selecting an optimal deduplication configuration and an optimal compression configuration based on the application type.

In accordance with another aspect of the invention is a system used for managing data storage system performance, the system comprising a processor configured to: analyze an input/output (I/O) pattern for a storage object; identify an application type based on the I/O pattern; and select an optimal deduplication configuration and an optimal compression configuration based on the application type.

In accordance with another aspect of the invention, a computer program product comprising a computer readable medium is encoded with computer executable program code configured to analyze an input/output (I/O) pattern for a storage object; identify an application type based on the I/O pattern; and select an optimal deduplication configuration and an optimal compression configuration based on the application type.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENTS(S)

Aspects of the inventive concepts will be described as being implemented in a data storage system that includes a host server and a storage system. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory computer-readable medium and implemented by multi-purpose tangible processors, and any combinations thereof.

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system. Additionally, method steps disclosed herein can be performed within a processor, a memory, a computer product having computer code loaded thereon, and the like.

Figure 1:
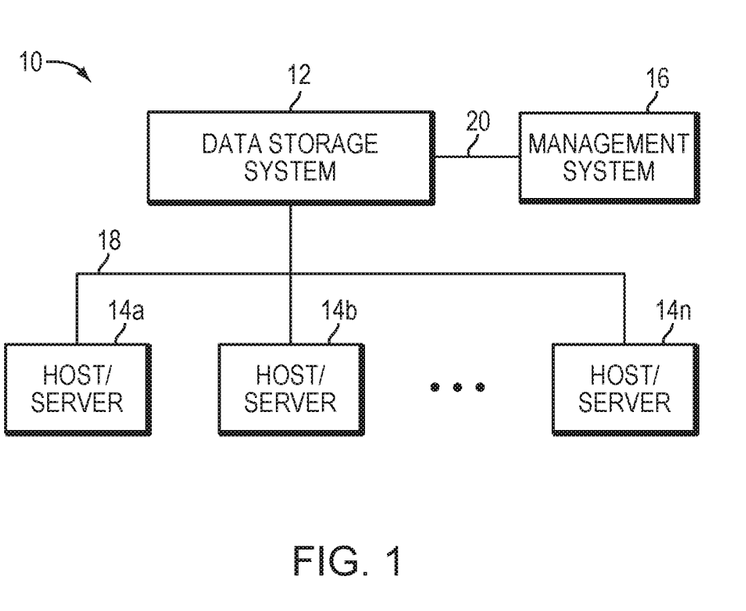
FIG. 1 is an example of an embodiment of a computer system, in accordance with an embodiment of the present disclosure.

With reference to FIG. 1, we show an example of an embodiment of a computer system that may be used in connection with performing the technique or techniques described herein. The computer system 10 includes one or more data storage systems 12 connected to host systems 14*a*-14*n* through communication medium 18 (such as back-end and frontend communication medium). The system 10 also includes a management system 16 connected to one or more data storage systems 12 through communication medium 20. In this embodiment of the computer system 10, the management system 16, and the N servers or hosts 14*a*-14*n* may access the data storage systems 12, for example, in performing input/output (I/O) operations, data requests, and other operations.

Figure 2:
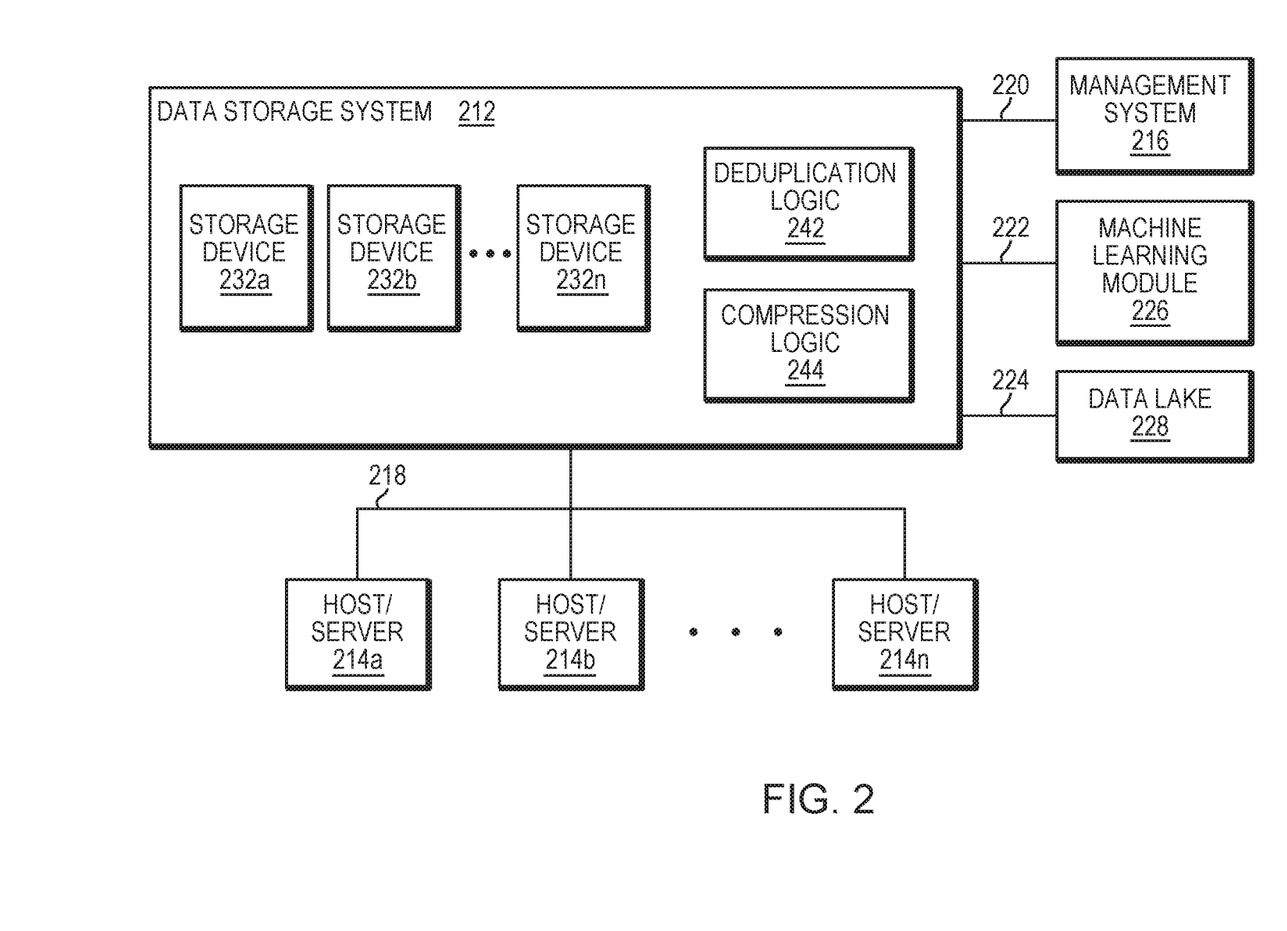
FIG. 2 is a block diagram of a system in accordance with embodiments of the present disclosure.

Data storage systems 12 are arrangements of hardware and software that typically include multiple storage processors, discussed in more detail with regard to FIG. 2, coupled to arrays of non-volatile storage devices, such as magnetic disk drives, electronic flash drives, and/or optical drives. The storage processors service I/O operations that arrive from host machines 14*a*-14*n*. The received I/O operations specify storage objects that are to be written, read, created, or deleted. The storage processors run software that manages incoming I/O operations and performs various data processing tasks to organize and secure the host data stored on the non-volatile storage devices.

The communication medium 18 may be any one or more of a variety of networks or other type of communication connections as known to those skilled in the art. Each of the communication mediums 18 and 20 may be a network connection, bus, and/or other type of data link, such as hardwire, wireless, or other connections known in the art. For example, the communication medium 18 may be the Internet, an intranet, an optical network, a wireless network, or other hardwired connection(s) by which the host systems 14*a*-14*n* may access and communicate with the data storage systems 12, and may also communicate with other components (not shown) that may be included in the computer system 10. In at least one embodiment, the communication medium 20 may be a LAN connection and the communication medium 18 may be an iSCSI or SAN through Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like.

Some or all of the connections by which the hosts 14a-14n, management system 16, and data storage system 12 may be connected to their respective communication medium may pass through other communication devices, such as a connection switch or other switching equipment, which may exist as part of a phone line, a repeater, a multiplexer, a satellite system, or a wireless network. In at least one embodiment, the hosts 14a-14n may communicate with the data storage system 12 over an iSCSI or Fibre Channel connection and the management system 16 may communicate with the data storage system 12 over a separate network connection using TCP/IP. It should be noted that although FIG. 1 illustrates communications between the hosts 14a-14n and data storage system 12 being over a first connection 18, and communications between the management system 16 and the data storage system 12 being over a second different connection 20, an embodiment may also use the same connection. The particular type and number of connections may vary in accordance with particulars of each embodiment.

Each of the host computer systems 14a-14n may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system 12, for example, by using management software to define a logical grouping of logically defined devices, referred to elsewhere herein as a storage group (SG), or by restricting access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by Dell EMC of Hopkinton, Mass. However, as will be appreciated by those skilled in the art, the techniques herein are applicable for use with other data storage arrays by other vendors and with other components than as described herein for purposes of example. We use the terms "data storage array" and "data storage system" interchangeably herein throughout.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described throughout this specification for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the back-end and frontend communication medium. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In the following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein. Furthermore, data storage systems and methods performed thereon as described with reference to other Figures may likewise be comprised of configurations and components as described with reference to FIG. 1.

The data storage system 12 may include any one or more different types of disk devices such as, for example, a SATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block-based storage system and a file-based storage hardware, such as a VNX™, VNXe™, or Unity™ system (produced by Dell EMC of Hopkinton, Mass.). In such an arrangement, typically the file-based storage hardware operates as a front-end to the block-based storage system such that the file-based storage hardware and the block-based storage system form a unified storage system such as Unity systems.

Conventionally, and with reference to FIG. 1, data storage systems 12 typically have deduplication and/or data compression settings enabled or disabled. The granularity of these settings is not typically checked on a per-data-write basis unless a user manually adjusts deduplication or compression settings prior to writing a data storage object, also alternatively called a data block. In some conventional systems, it is possible to eschew data deduplication or data compression if the management system 16 determines that overall system 10 performance is not being enhanced by deduplication or compression. In addition, system administrators can manually alter deduplication and compression settings. But manually altering these settings is, by its very nature, not automatic, and oftentimes not data block specific.

The ability to manage and modify deduplication and compression settings is further attenuated in the situation where storage 12 is provided by a third-party. In this instance, an entity's ability to alter deduplication and compression settings could be non-existent at worst and limited at best.

There are several advantages to embodiments disclosed herein. From a high-level perspective, data deduplication and data compression generally reduce the overall amount of data stored within a data storage system. Skilled artisans also recognize, however, that both data deduplication and data compression affect additional overhead costs on the data storage system in the form of CPU processing power, metadata storage requirements and the like. Given these tradeoffs, disclosed embodiments allow clients to make intelligent decisions, whether automated or semi-automated, regarding when the overall system cost for deduplication and/or compression will result in a net-positive data storage system enhancement.

Our proposed solutions make determinations regarding which data are compressible, which data are deduplicable, and which data can be both compressed and deduplicated. In some embodiments, we snake this determination by identifying particular applications that may be running on the data storage system at a given point in time. We identify an application based on observing and analyzing input/output (IO) patterns. Once we have identified the application, we select optimal deduplication and/or compression settings.

By way of example, and without limitation, those of skill in the art recognize that data backups typically create a scenario where a substantial amount of duplicative data is created. In this instance, data deduplication would be beneficial. Online Transaction Processing ("OLTP"), however, typically creates data that does not lend itself to either deduplication or compression.

Currently, deduplication settings and compression settings are either turned ON or OFF. If a data storage system is running OLTP applications and backup operations, ideally, data deduplication and data compression would be OFF for the OLTP applications. When data backups are running, deduplication should be ON.

With reference to FIG. 2, we show a data storage system 212 according to embodiments herein. The data storage system 212 is coupled via communication medium 218 to a plurality of hosts 214a, 214b, 214n. In some embodiments, one or more hosts 214a, 214b, 214n could be a server. Data storage 212 system is further coupled to management system 216 via communication medium 220, machine learning module 226 via communication medium 222, and data lake 228 via communication medium 224.

As was the case with FIG. 1, each of the communication mediums 218, 220, 222, 224 may be a network connection, bus, and/or other type of data link, such as hardwire, wireless, or other connections known in the art. Moreover, while management system 216, machine learning module 226, and data lake 228 are depicted as separate components, in embodiments, one or more of them could be combined into another component within the system or could be housed in the cloud. For example, and without limitation, machine learning module 226 could be part of management system 216. It could be integrated into host 214a-n. Management system 216 could be integrated into data storage system 212 or into host 214. Machine learning module 226 and data lake 228 could be part of a single component. Data lake 228 could be cloud-based, and so forth.

Returning to FIG. 2, data storage system 212 comprises storage devices 232a-n, deduplication logic 242 and compression logic 244. In alternate embodiments, deduplication logic 242 and/or compression logic 244 could reside in host 214a-n or as standalone components.

Figure 3:
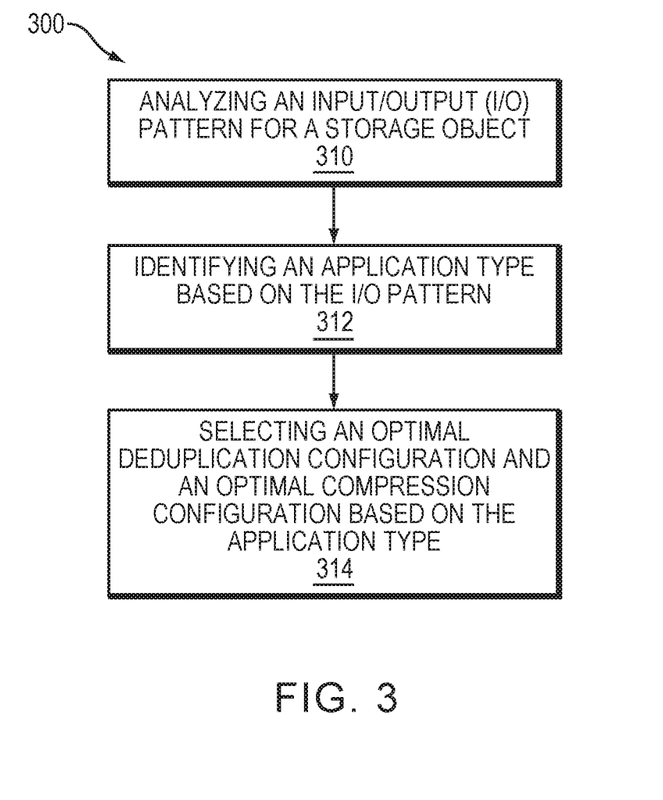
FIG. 3 is a flow diagram showing a method of selecting a deduplication setting and a compression setting for a data storage object.

FIG. 3 depicts steps of a method 300 associated with embodiments for managing data storage system performance. As an overarching principle, in embodiments, we analyze 310 input/output (IO) patterns for data storage objects as way to identify 312 an application type associated with the data storage object. We then select 314 a deduplication setting and a compression setting based on the application type. With reference to systems depicted in FIGS. 1 and 2, analyzing 310 IO patterns could be performed by data storage system 12, 212. In alternate embodiments, data storage system 12, 212 could also gather system performance characteristics, which could be used to adjust deduplication or compression settings further optimizing performance. Management system 16, 216 could maintain a catalog of IO patterns, containing information such as application type, application IO rate, and other metrics such as overall array load, and general system performance measurements as compared in some embodiments with system polices established by clients. In conjunction with the information stored by management system 16, 216, in conjunction with deduplication logic 242 and compression logic 244 identify 312 an application type based on an IO pattern and select 314 an optimal deduplication configuration and an optimal compression configuration. In alternate embodiments, one or both of deduplication logic 242, 442 and compression logic 244, 444 could reside in host 214*a-n*, or as a standalone component as shown in the data storage logic 440 of FIG. 4.

In one exemplary embodiment, exemplary IO patterns could be discerned from read-write operations, read-write splits, sequential-random operations splits, the size of an operation, whether the order of the arrival of IO requests is constant or sporadic, and the like. In some embodiments, we analyze 310 an IO pattern in the context of the type of storage object associated with the IO Pattern. Exemplary storage objects are LUNs, Virtual Volumes (VVOLs) and File Systems. In this exemplary embodiment, we can select 314 deduplication and compression settings by comparing the observed patterns against well-known patterns in order to identify 312 the most likely application producing the observed pattern. In one embodiment, we select 314 deduplication and compression configurations that optimize storage space savings.

In some embodiments, well-known patterns could be stored in management system 216. In alternate embodiments, machine learning module 226 could capture and analyze heuristic data for the data storage system 212. Part of the heuristic data set captured could be information sufficient to identify additional IO patterns. Heuristic data could in some embodiments be stored in data lake 228.

In embodiments, after selecting 314 a deduplication configuration and a compression configuration, we could determine whether using deduplication and/or compression would have an overall positive effect on the storage system. In this embodiment, deduplication logic 242 or compression logic 244 could calculate an IO rate as well as an overall storage system load for the identified 312 application assuming the identified 312 deduplication and compression configurations are applied. In these embodiments, CPU processing increases, IO processing delays, increased queue lengths, and effects to the memory footprint of the system in the form of deduplication versus buffer cache and cache hit/miss rates, for example, could be considered when evaluating the IO rate and storage array load.

If the overall effect on the IO rate and the storage array load is negatively, we incrementally reduce the amount of space savings realized by the identified 312 deduplication and compression configurations. In some embodiments, reducing the space savings could entail disabling deduplication and/or compression or altering deduplication and/or compression configurations. Exemplary deduplication settings are: offline deduplication, pattern matching deduplication, using a simple (easy to calculate) hash for initial deduplication candidate identification followed by a full comparison of data, using a full hash for deduplication, and using synchronous or asynchronous deduplication. Exemplary compression configurations that could be altered would be to choose from a low-fast compression configuration, a medium-medium compression configuration, and a strong-slow compression configuration.

Once the optimal deduplication and compression configurations have been selected 314, they can be applied to the data storage system 212.

In some embodiments, it may be advantageous to bifurcate a data storage object if, for example, the optimal deduplication and compression configurations for the two segments differ. In these embodiments, the systems, methods, and non-transitory computer products could split the storage object into a first data block and a second data block. Once the storage object is split into two or more data blocks, optimization could be performed in a manner similar to that in which the methods, systems, and products work with regard to a single storage object. Specifically, the data storage system 12, 212 could analyze a first IO pattern for the first data block and a second IO pattern for the second block. Deduplication logic 242 and compression logic 244 could identify a first and second application type associated with the first and second data blocks, respectively. Deduplication logic 242 and compression logic 244 could also select optimal deduplication and compression configurations based on the first and second application types.

In some instances, it may be unclear what deduplication or compression configuration should be in order to optimize performance. For example, and without limitation, the methods, systems, and products may be unable to determine optimal configurations for a particular application type. Alternatively, the application type may not be definitive. In these instances, embodiments could select preliminary deduplication and compression configurations. Once these preliminary configurations are chosen, these embodiments could evaluate a predicted future system performance if these preliminary configurations were applied. This process could be performed iteratively in order to hone in on the optimal deduplication and compression configurations.

In alternate embodiments where it is uncertain what the proper deduplication and compression configurations should be, the data storage system could have a utility running thereon as perhaps a background task whereby the utility observes which configurations are found to be optimal either by monitoring actual system performance or by observing the results of the predictive analysis. The utility could add the application type correlated with the optimal deduplication and compression configurations to an application profile, which could be stored in the data lake 228, or on the data storage system 12, 212, the management system 16, 216, at the host 14*a-n*, 214*a-n*, in the cloud, or externally. In these embodiments, machine learning module 226 and data lake 228 could coordinate with data storage system 212, deduplication logic 242 and compression logic 244 to select the optimal configurations.

In all embodiments, the set of application profiles and their commensurate effect on system performance can be stored in data lake 228. By way of example, and without limitation, some exemplary performance metrics could include a storage system load, a space saving value, an I/O processing delay, a processing utilization value, an IO queue length, a memory footprint, a deduplication versus a buffer cache rate, a cache hit rate, a cache miss rate, or a central processing unit usage value.

These embodiments have myriad advantages over the prior art including and without limitation, a more customized way to deduplicate and compress data within a data storage system. The embodiments recognize the connection between optimized deduplication and compression configurations and application types for data storage objects. They further automate the process of altering deduplication and compression configurations. They allow for machine learning to assist users/clients in configuring deduplication and compression for a given storage system. They allow for parsing of storage objects into smaller data blocks so as to be able to customize deduplication and compression at a more granular level. While these are some of the advantages realized by the current invention, those of skill in the art will recognize that this list is not exhaustive.

Figure 4:
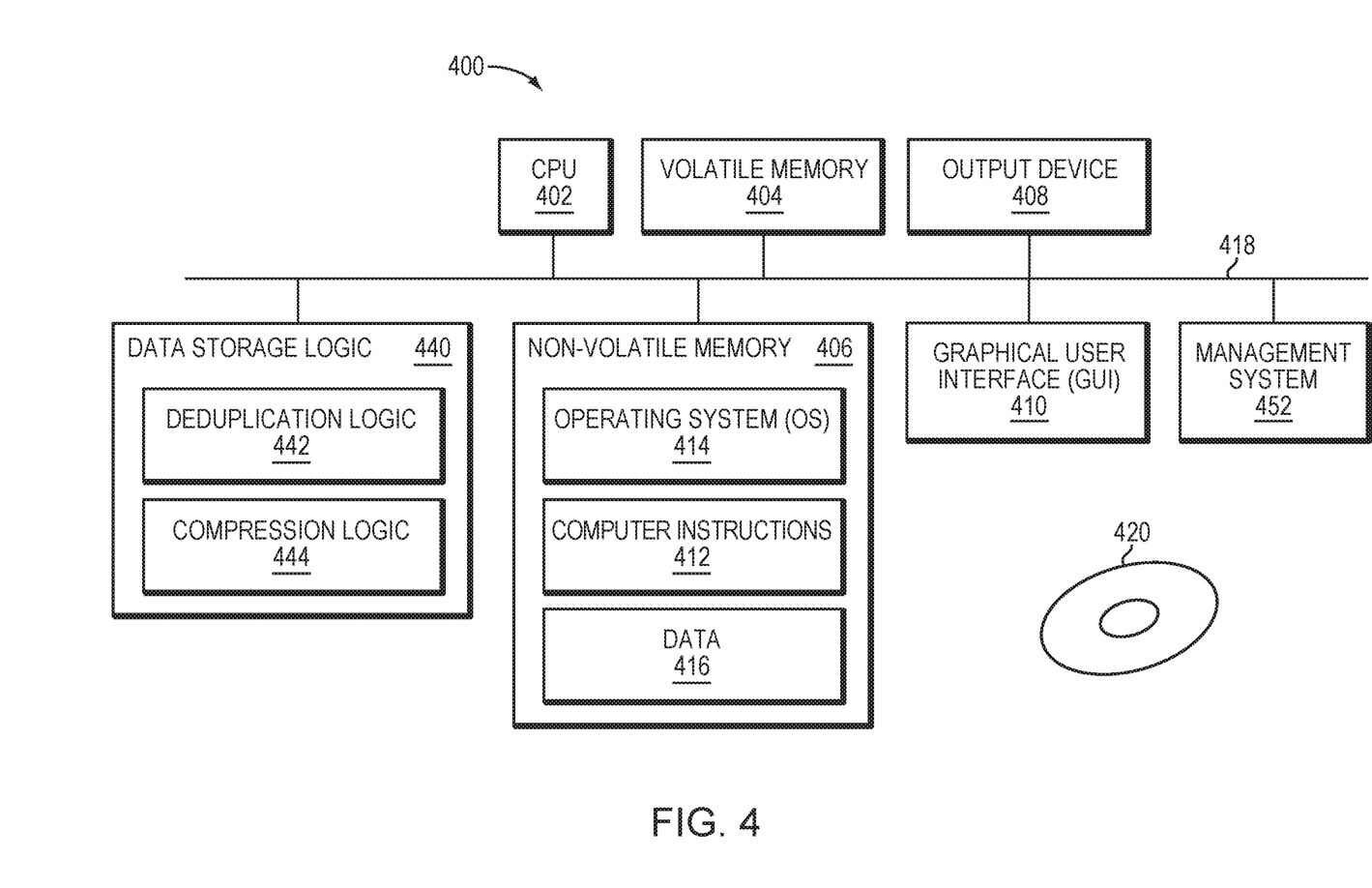
FIG. 4 is a block diagram of a computer performing in accordance with embodiments of the present disclosure.

FIG. 4 illustrates a block diagram of a computer 400 that can perform at least part of the processing described herein, according to one embodiment. The computer 400 may include a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 may be configured to store computer instructions 412, an operating system 414, and data 416. In one example, the computer instructions 412 are executed by the processor 402 out of volatile memory 404. In one embodiment, an article 420 comprises non-transitory computer-readable instructions. In some embodiments, the computer 400 corresponds to a virtual machine (VM). In other embodiments, the computer 400 corresponds to a physical computer. In some embodiments, the computer 400 includes data storage logic 440 having one or more of a deduplication logic 442 module or a compression logic 444 module.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing data storage system performance, the method comprising:
   analyzing an input/output (I/O) pattern for a storage object of a data storage system, the I/O pattern comprising I/O operations of one or more applications executing on at least one corresponding host computer, the I/O operations being directed to the storage object of the data storage system;
   identifying an application type based on a result of analyzing the I/O pattern; and
   selecting an optimal deduplication configuration and an optimal compression configuration based on the application type;
   wherein identifying an application type based on a result of analyzing the I/O pattern comprises identifying a particular type of application that has generated I/O operations of the I/O pattern, from among a plurality of applications that utilize the data storage system;
   wherein the analyzing, identifying and selecting are performed in the data storage system and/or in an associated management system, but external to one or more hosts that execute the plurality of applications that utilize the data storage system; and
   wherein selecting the optimal deduplication configuration and the optimal compression configuration further comprises:
      selecting a preliminary deduplication configuration and a preliminary compression configuration based on the application type; and
      evaluating the preliminary deduplication configuration and the preliminary compression configuration by predicting one or more future performance characteristics of the data storage system in order to determine the optimal deduplication configuration and the optimal compression configuration.

2. The method of claim 1, further comprising applying the optimal deduplication configuration and the optimal compression configuration to the data storage system.

3. The method of claim 1, wherein the application type is chosen from a catalog of application types, the catalog of application types being compiled by a machine learning module.

4. The method of claim 1, wherein selecting the optimal deduplication configuration and the optimal compression configuration is further based on an application input/output (I/O) rate and an overall array load.

5. The method of claim 1, wherein the storage object is split into a first data block and a second data block, the method further comprising:
analyzing a first input/output (I/O) pattern for the first data block;
analyzing a second input/output (I/O) pattern for the second data block;
identifying a first application type based on the first I/O pattern;
identifying a second application type based on the second I/O pattern;
selecting a first optimal deduplication configuration and a first optimal compression configuration based on the first application type; and
selecting a second optimal deduplication configuration and a second optimal compression configuration based on the second application type.

6. The method of claim 1, further comprising:
storing the application type, the optimal deduplication configuration and the optimal compression configuration in a data lake.

7. The method of claim 1, wherein the one or more future performance characteristics comprise at least one of a storage system load, a space saving value, an I/O processing delay, a processing utilization value, an IO queue length, a memory footprint, a deduplication versus a buffer cache rate, a cache hit rate, a cache miss rate, or a central processing unit usage value.

8. The method of claim 6, further comprising:
evaluating a performance criterion of the data storage system after applying the optimal deduplication configuration and the optimal compression configuration to the data storage system; and
storing the performance criterion in the data lake.

9. A system for use in managing data storage system performance, the system comprising a processor configured to:
analyze an input/output (I/O) pattern for a storage object of a data storage system, the I/O pattern comprising I/O operations of one or more applications executing on at least one corresponding host computer, the I/O operations being directed to the storage object of the data storage system;
identify an application type based on a result of analyzing the I/O pattern; and
select an optimal deduplication configuration and an optimal compression configuration based on the application type;
wherein identifying an application type based on a result of analyzing the I/O pattern comprises identifying a particular type of application that has generated I/O operations of the I/O pattern, from among a plurality of applications that utilize the data storage system;
wherein the analyzing, identifying and selecting are performed in the data storage system and/or in an associated management system, but external to one or more hosts that execute the plurality of applications that utilize the data storage system;
wherein selecting the optimal deduplication configuration and the optimal compression configuration further comprises:
selecting a preliminary deduplication configuration and a preliminary compression configuration based on the application type; and
evaluating the preliminary deduplication configuration and the preliminary compression configuration by predicting one or more future performance characteristics of the data storage system in order to determine the optimal deduplication configuration and the optimal compression configuration.

10. The system of claim 9, wherein the processor is further configured to apply the optimal deduplication configuration and the optimal compression configuration to the data storage system.

11. The system of claim 9, wherein the application type is chosen from a catalog of application types, the catalog of application types being compiled by a machine learning module.

12. The system of claim 9, wherein selecting the optimal deduplication configuration and the optimal compression configuration is further based on an application input/output (I/O) rate and an overall array load.

13. The system of claim 9, wherein the storage object is split into a first data block and a second data block, the processor further configured to:
analyze a first input/output (I/O) pattern for the first data block;
analyze a second input/output (I/O) pattern for the second data block;
identify a first application type based on the first I/O pattern;
identify a second application type based on the second I/O pattern;
select a first optimal deduplication configuration and a first optimal compression configuration based on the first application type; and
select a second optimal deduplication configuration and a second optimal compression configuration based on the second application type.

14. The system of claim 9, wherein the processor is further configured to:
store the application type, the optimal deduplication configuration and the optimal compression configuration in a data lake.

15. The system of claim 9, wherein the one or more future performance characteristics comprise at least one of a storage system load, a space saving value, an I/O processing delay, a processing utilization value, an IO queue length, a memory footprint, a deduplication versus a buffer cache rate, a cache hit rate, a cache miss rate, or a central processing unit usage value.

16. The system of claim 14, wherein the processor is further configured to:
evaluate a performance criterion of the data storage system after applying the optimal deduplication configuration and the optimal compression configuration to the data storage system; and
store the performance criterion in the data lake.

17. A non-transitory computer readable medium with program instructions stored thereon to perform the following acts:
- analyze an input/output (I/O) pattern for a storage object of a data storage system, the I/O pattern comprising I/O operations of one or more applications executing on at least one corresponding host computer, the I/O operations being directed to the storage object of the data storage system;
- identify an application type based on a result of analyzing the I/O pattern; and
- select an optimal deduplication configuration and an optimal compression configuration based on the application type;
- wherein identifying an application type based on a result of analyzing the I/O pattern comprises identifying a particular type of application that has generated I/O operations of the I/O pattern, from among a plurality of applications that utilize the data storage system;
- wherein the analyzing, identifying and selecting are performed in the data storage system and/or in an associated management system, but external to one or more hosts that execute the plurality of applications that utilize the data storage system;
- wherein selecting the optimal deduplication configuration and the optimal compression configuration further comprises:
  - selecting a preliminary deduplication configuration and a preliminary compression configuration based on the application type; and
  - evaluating the preliminary deduplication configuration and the preliminary compression configuration by predicting one or more future performance characteristics of the data storage system in order to determine the optimal deduplication configuration and the optimal compression configuration.

18. The non-transitory computer readable medium of claim 17, with program instructions stored thereon to further perform the following acts:
- apply the optimal deduplication configuration and the optimal compression configuration to the data storage system.

19. The non-transitory computer readable medium of claim 17, with program instructions stored thereon to further perform the following acts:
- store the application type, the optimal deduplication configuration and the optimal compression configuration in a data lake.

20. The non-transitory computer readable medium of claim 17, wherein the one or more future performance characteristics comprise at least one of a storage system load, a space saving value, an I/O processing delay, a processing utilization value, an IO queue length, a memory footprint, a deduplication versus a buffer cache rate, a cache hit rate, a cache miss rate, or a central processing unit usage value.

* * * * *